(12) United States Patent
Sheldon

(10) Patent No.: US 7,399,078 B2
(45) Date of Patent: Jul. 15, 2008

(54) ATTACHMENT OF PRESCRIPTION LENSES TO EYEWEAR HAVING WRAP-TYPE FRAMES

(76) Inventor: Brent Sheldon, 72 Sherbrooke West, Suite 3, Montreal (CA) H2X 1X3

( * ) Notice: Subject to any disclaimer, the term of this patent is extended or adjusted under 35 U.S.C. 154(b) by 97 days.

(21) Appl. No.: 11/539,016

(22) Filed: Oct. 5, 2006

(65) Prior Publication Data

US 2007/0091261 A1    Apr. 26, 2007

Related U.S. Application Data

(63) Continuation-in-part of application No. 10/893,359, filed on Jul. 19, 2004, now abandoned, which is a continuation-in-part of application No. 10/677,351, filed on Oct. 3, 2003.

(51) Int. Cl.
G02C 7/08    (2006.01)
G02C 9/00    (2006.01)
G02C 13/00   (2006.01)

(52) U.S. Cl. ............................ 351/57; 351/47; 351/86; 351/154; 351/178

(58) Field of Classification Search .................. 351/41, 351/44, 47, 48, 57, 83–86, 103–109, 154, 351/178
See application file for complete search history.

(56) References Cited

U.S. PATENT DOCUMENTS 4,021,103 A    5/1977  Gaspari
4,371,238 A    2/1983  L'Hospice
4,689,838 A    9/1987  Angermann et al.
4,971,431 A    11/1990 Gerard
5,371,554 A    12/1994 Aspesi
5,631,716 A    5/1997  Chao
6,074,059 A    6/2000  Glass et al.
6,086,199 A    7/2000  Holland et al.
6,129,435 A    10/2000 Reichow et al.
6,394,600 B1   5/2002  Horn et al.
6,502,937 B2 * 1/2003  Yang ........................... 351/57
6,592,220 B1   7/2003  Cheong
6,676,257 B2   1/2004  Sheldon et al.
6,938,277 B2   9/2005  Lindahl
7,325,919 B2 * 2/2008  Sheldon ....................... 351/86
2005/0073643 A1 4/2005 Sheldon
2006/0050227 A1 3/2006 Fernandez et al.

FOREIGN PATENT DOCUMENTS

FR    2329604    10/1989

* cited by examiner

Primary Examiner—Huy K Mai
(74) Attorney, Agent, or Firm—Ogilvy Renault LLP

(57) ABSTRACT

Eyewear having a curved frame includes a protruding cover lens unit. The cover lens unit can be removably attached to the curved frame to position a less curved non-prescription lens in a protruding position with respect to the curved frame, thereby creating a space within the protruding lens unit. A prescription lens is removably attached to the curved frame and disposed behind the non-prescription lens. The prescription lens extends into the space without interference with the non-prescription lens.

13 Claims, 5 Drawing Sheets

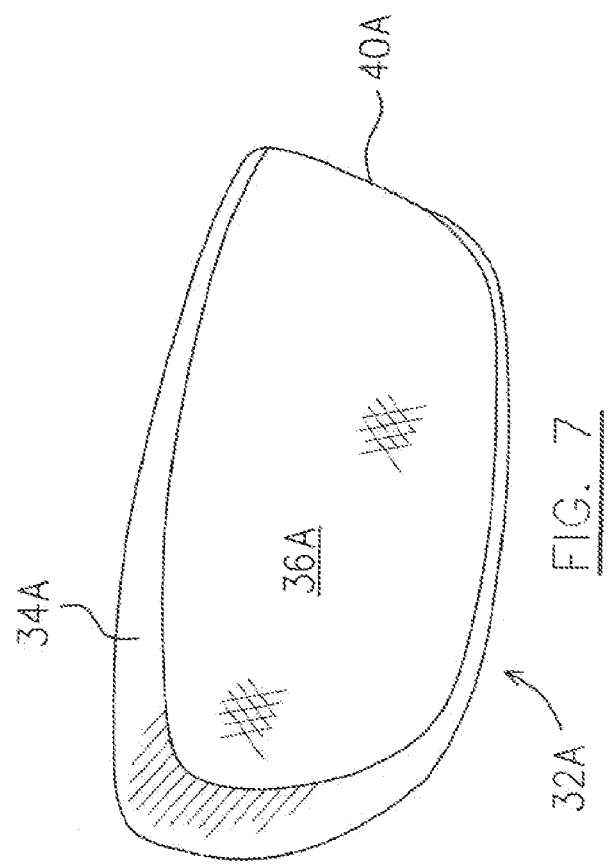
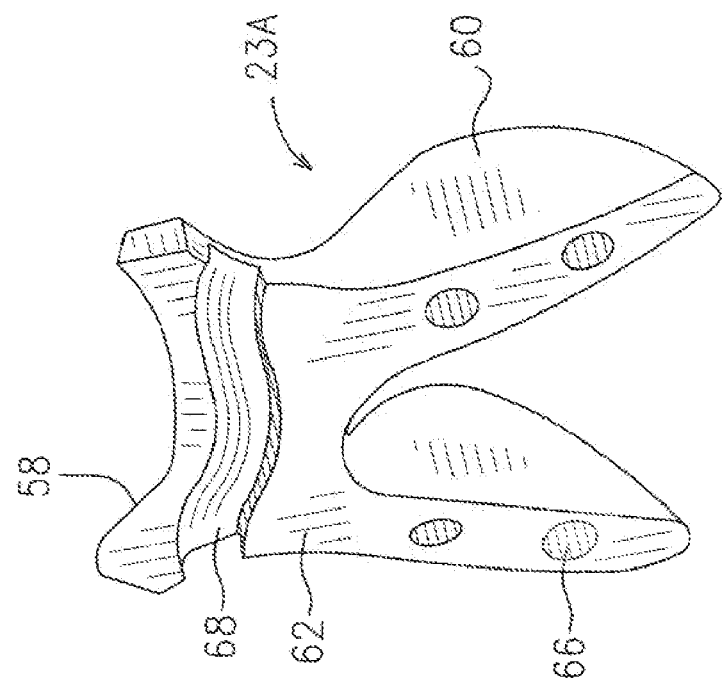

ATTACHMENT OF PRESCRIPTION LENSES TO EYEWEAR HAVING WRAP-TYPE FRAMES

CROSS-REFERENCE TO RELATED APPLICATIONS this is a Continuation in Part of Applicant's U.S. patent application Ser. No. 10/893,359, filed on Jul. 19, 2004 now abandoned which is a Continuation in Part of Applicant's U.S. patent application Ser. No. 10/677,351, filed on Oct. 3, 2003.

TECHNICAL FIELD

The present invention relates to eyewear, and more particularly to attachment of prescription lenses to eyewear having wrap-type frames.

BACKGROUND OF THE INVENTION

Eyewear having wrap-type frames which are much curved, are designed to fit closely to a user's face. The lenses used in such eyewear must also be wrap-type and thus have a relatively deep curvature. As a result, base 6 lenses which are relatively less curved, cannot be attached to a base 8 or 9 frame which is more curved (in a wrap-type). It should be noted that most prescription glasses are flat or have a relatively shallow curvature, in contrast to wrap-type eyewear. This is because the more a prescription lens curves, the core complicated the optics of the lens become due to the bending of light. It is also desirable to position prescription lenses in front of the user's eyes substantially perpendicular to the forward direction. Therefore, base 6 frames are commonly used with prescription glasses while base 8 or 9 frames which are usually referred to as "wrap-type" frames, are less common for use with prescription lenses. The prescription glasses having relatively curved frames are very expensive to manufacture because it is more difficult to achieve a good quality of the desired optics thereof. However, curved frames are desirable in many eyewear applications.

therefore, there is a need for attachment of prescription lenses to eyewear having wrap-type frames.

SUMMARY OF THE INVENTION

One object of the present invention is to provide eyewear having a curved frame to which prescription lenses are attachable.

In accordance with one aspect of the present invention there is a method provide for attaching a prescription lens to eyewear having a curved frame defining a first curvature, which comprises (a) removably attaching a non-prescription lens having a second curvature thereof, to the curved frame in a protruding position with respect to a front side of the curved frame, by means of a protruding rim element, the protruding rim element having an outer periphery defining the first curvature for removable attachment with the curved frame and having an inner periphery protruding forwardly from the outer periphery thereof to define the second curvature for attachment of the non-prescription lens, thereby creating a space defined by the protruding rim element and located behind the non-prescription lens; and (b) removably attaching the prescription lens to the curved frame to allow the prescription lens to extend into the space without interference with the non-prescription lens.

In accordance with another aspect of the present invention there is provided a pair of glasses which comprise a curved frame defining a first curvature thereof; a pair of protruding cover lens units removably attached to the curved frame to position a pair of non-prescription lenses having a second curvature thereof in a protruding position with respect to a front side of the curved frame, each of the protruding cover lens units including a protruding rim element having an outer periphery defining the first curvature for the removable attachment thereof to the curved frame and having an inner periphery protruding forwardly from the outer periphery thereof to define the second curvature for at least partially circling and securing one of the non-prescription lenses; and a prescription lens unit including a pair of interconnected prescription lenses removably attached to the curved frame, each of the prescription lenses extending into a space defined by the respective protruding rim elements and located behind the respective non-prescription lenses.

Other aspects and features of the present invention will be better understood with reference to the preferred embodiments described hereinafter.

BRIEF DESCRIPTION OF THE DRAWINGS

Reference will now be made to the accompanying drawings showing by way of illustration, the preferred embodiments of the present invention, in which:

FIG. 6 is a perspective view in an enlarged scale, of a nose support used in the embodiments of FIGS. 1 and 3; and FIG. 7 is front elevational view of a protruding rim element used in the embodiment of FIG. 3.

DETAILED DESCRIPTION OF THE PREFERRED EMBODIMENT

Figure 1:
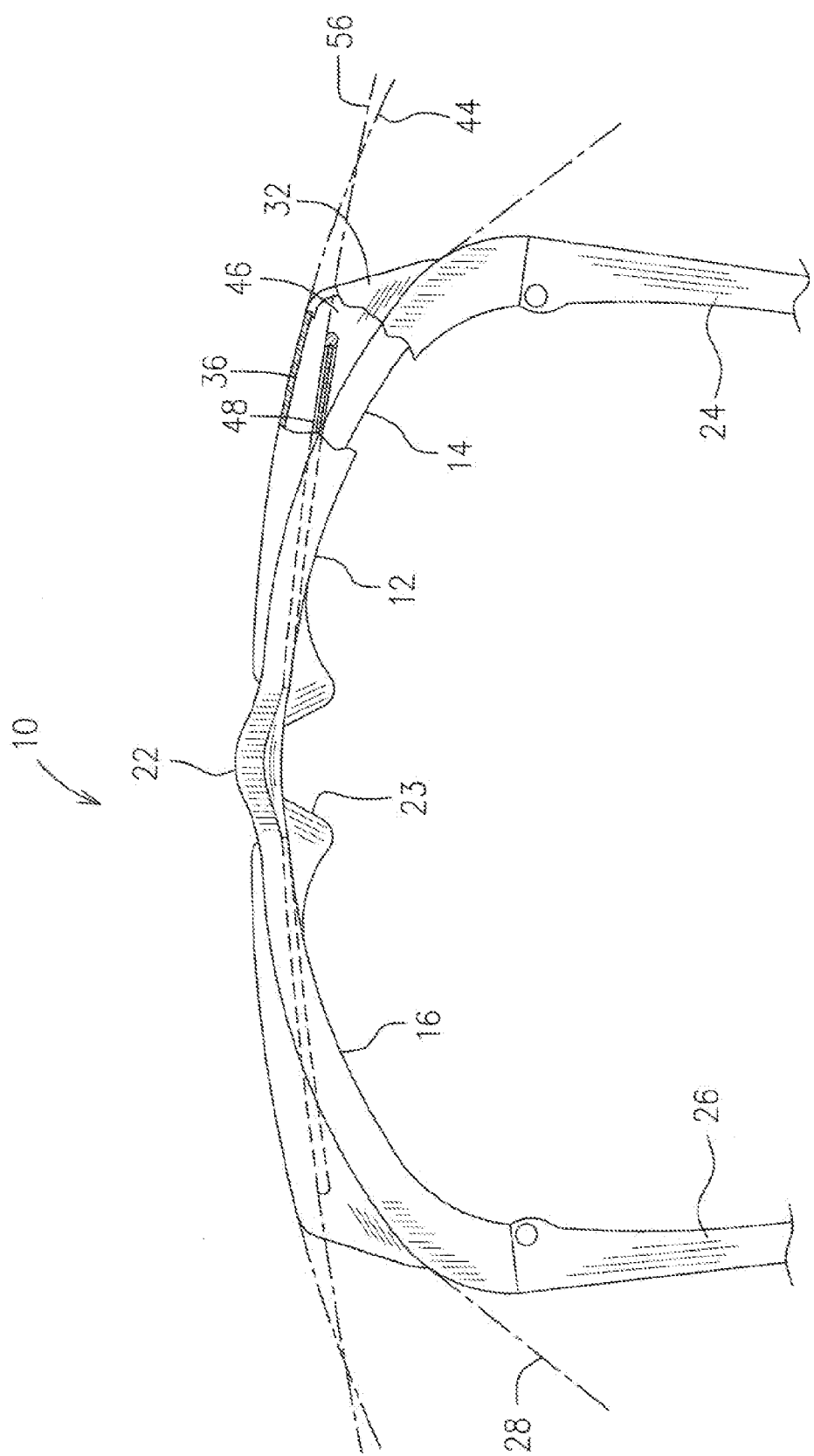
FIG. 1 is a top planar view of eyewear having a curved frame with a pair of protruding cover lens units and a pair of prescription lenses removably attached thereto according to one embodiment of the present invention.
Figure 2:
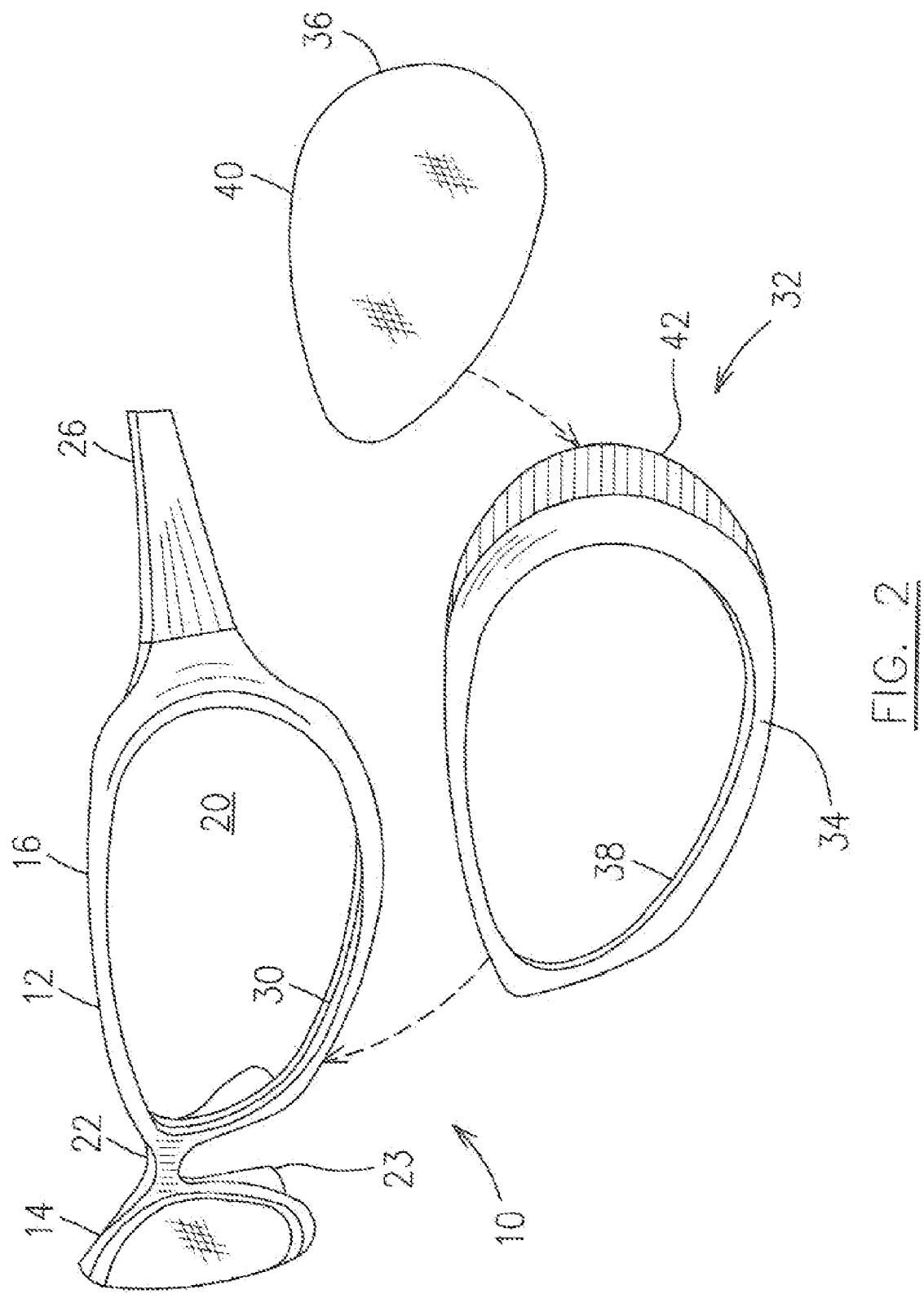
FIG. 2 is a partially exploded perspective view of the eyewear of FIG. 1, with the prescription lenses removed, showing the protruding cover lens unit.

FIGS. 1 and 2 illustrate eyewear according one embodiment of the present invention, such as a pair of glasses 10. The glasses 10 are provided with a frame 12 having a relatively curved configuration to fit a user's head, which is referred to as a wrap-type frame. The frame 12 generally includes two frame sections 14, 16 defining openings therein indicated by numeral 20, only one of which is shown in FIG. 2. A bridge 22 interconnects the two frame sections 14, 16 and extends between the inner ends thereof. A nose support 23 is attached to the curved frame 12 and is disposed behind and centered with the bridge 22. A pair of temples 24 and 26 are preferably pivotably attached to the outer end of the respective frame sections 14, 16.

The curved frame 12, for example a base 8 frame which is less common in prescription glasses, defines a curvature illustrated by line 28, thereof. The inner periphery of the respective openings 20 of the curved frame 12 defines a shallow circumferential recess 30 for removable attachment of lenses in a conventional manner. The respective recesses 30 substantially correspond to the curvature 28 of the frame 12 such that a base 8 lens which has a curvature similar to the curvature 28, would be attachable to the frame 12.

Instead of attachment of base 8 lenses directly to the frame 12, a pair of protruding cover lens units 32 are removably attached to the curved frame 12 by being received within the respective recess 30 of the frame 12. Each of the protruding cover lens units 32 includes a protruding rim element 34. The protruding rim element 34 in this embodiment, is preferably annular and defines an inner periphery having means for attachment of a non-prescription lens 36. In this embodiment, the means includes a shallow U-shaped groove 38 for encircling and snuggly receiving a peripheral edge 40 of the non-prescription lens 36. The protruding rim element 34 further defines an outer periphery 42 thereof, adapted to be snuggly fitted into the circumferential recess 30 in the inner periphery of the opening 20 of the curved frame 12. The outer periphery 42 of the protruding rim element 34 defines a curvature substantially equal to the curvature 28 of the curved frame 12 and the inner periphery of the protruding rim element 34 protrudes forwardly from the outer periphery thereof to define another curvature illustrated by line 44 which is equal to the curvature of the non-prescription lens 36. Preferably, the inner periphery of the protruding rim element 34 at the outer end thereof (the end close to the temples 24 or 26) protrudes further forwardly from the outer periphery 42 thereof relative to the inner periphery at the inner end thereof (the end close to the bridge 22). As a result, the curvature 44 defined by the inner periphery of the pair of protruding rim elements 34 is relatively flat or more shallow than the curvature 28 of the curved frame 12. Therefore, a space 46 is created which is defined by the respective protruding rim elements 34 and is located behind the respective non-prescription lenses 36.

A prescription lens unit 48 is removably attached to the curved frame 12 and is positioned behind the non-prescription lenses 36. This will be further described with reference to FIGS. 4-6 hereinafter.

Figure 3:
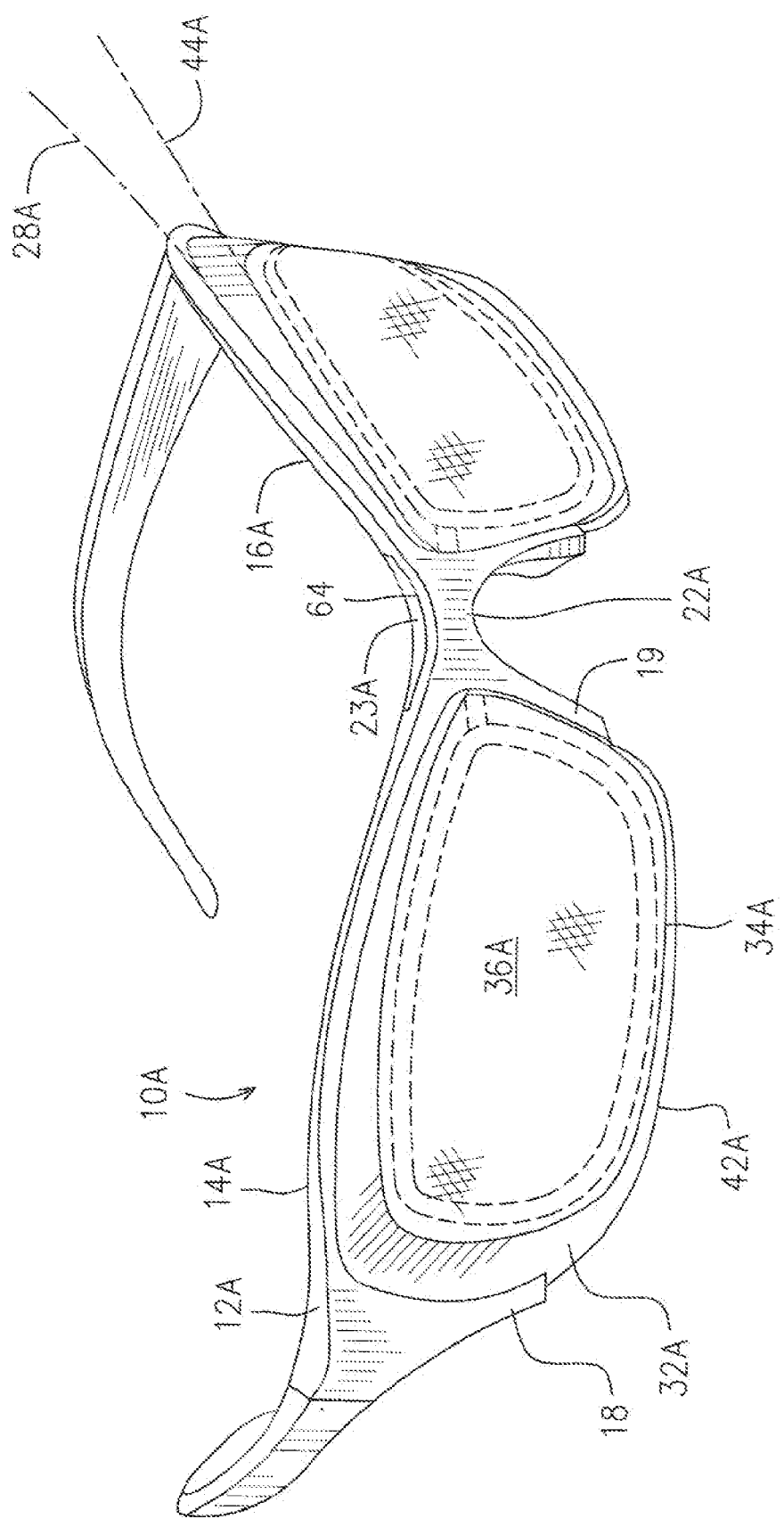
FIG. 3 is a perspective view of eyewear having a curved frame with a pair of protruding cover lens units and a pair of prescription lenses removably attached thereto, according to another embodiment of the present invention.
Figures 4, 5:
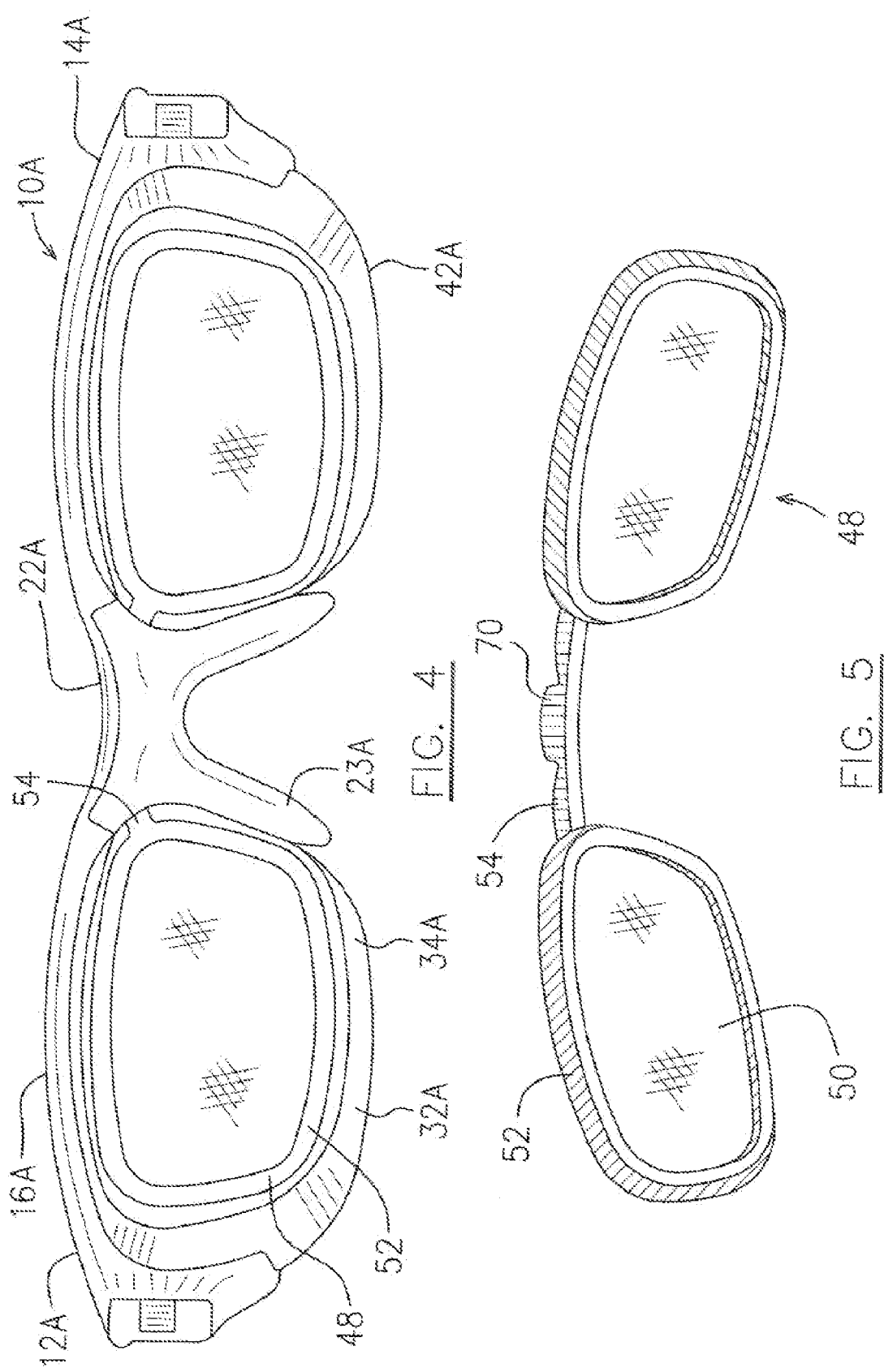
FIG. 4 is a rear elevational view of the eyewear of FIG. 3, showing the prescription lenses removably attached to the frame.
FIG. 5 is a perspective view of the prescription lenses used in the embodiments of FIGS. 1 and 3, showing the bridge extending between the prescription lenses and having means for positioning the prescription lenses to the frame.

FIGS. 3, 4 and 7 illustrate eyewear according to another embodiment of the present invention, such as a pair of glasses 10A similar to the glasses 10 in FIGS. 1 and 2. The glasses 10A have a curved frame 12A such as a base 8 frame, defining a curvature illustrated by line 28A thereof. Components similar to those of the embodiment shown in FIGS. 1 and 2 will be indicated by similar numerals ending with a capital A and will not be redundantly described herein. Therefore, only the differences therebetween will be described for the convenience of description.

In contrast to the frame 12 of eyewear 10 in FIGS. 1 and 2, which includes openings 20 defined in each of frame sections 14, 16, frame 12A of the glasses 10A in FIGS. 3 and 4 has respective outer and inner side portions 18 and 19 defined in each of the frame sections 14A and 16A. The outer and inner side portions 18, 19 in each of the frame sections 14A and 16A are spaced apart from each other and extend downwardly from an upper portion (not indicated) of each of the frame sections 14A, 16A for receiving the removably attached protruding cover lens unit 32A.

The protruding cover lens unit 32A includes a protruding rim element 34A which is similar to the protruding rim element 34 of FIGS. 1 and 2, to define an outer periphery 42A having a curvature illustrated by line 28A to match the curvature of frame 12A and to define a protruding inner periphery (not indicated) having a curvature 34A to match the curvature of the cover lens 36A. However, in contrast to the protruding rim element 34 of FIGS. 1 and 2, the protruding rim element 34A is circumferentially discontinued, preferably at the inner end thereof (close to the bridge 22A), generally defining a C-shape as more clearly shown in FIG. 7. The width of the protruding rim element 34A gradually decreases from the outer end thereof to the open inner end such that an un-encircled section of the peripheral edge 40A of the non-prescription lens 36A, forms a relatively smooth extension of both the inner and outer peripheries of the protruding rim element 34A at the open end thereof, as shown in FIG. 7.

A major section of the outer periphery 42A of the protruding rim element 34A with the un-encircled section of peripheral edge 40A of the non-prescription lens 32A, are snuggly fitted into a shallow groove (not shown) extending along the inner edge of each of the frame sections 14A, 16A. Because the inner edge of each of the frame sections 14A, 16A does not have a continuous periphery to encircle the entire periphery of the protruding cover lens unit 32A, the space between the outer and inner side portions 18, 19 of each of the frame sections 14A, 16A at the lowest ends thereof, is smaller than the space at any upper location thereof. The protruding cover lens unit 32A can thus be securely but releasably engaged with the respective frame sections 14A, 16A by a "click-in" action from either a front side or a rear side of the frame 12A depending on a specific groove structure of the frame 12A. The attached protruding cover lens unit 32A cannot be detached by pulling downwardly from the frame 12A. However, the removable attachment of the cover lens unit 32A to the frame 12A (or the protruding cover unit 32 to frame 12 of FIGS. 1 and 2) can be achieved otherwise using any known or new structural arrangement.

The prescription lens unit 48 (see FIG. 5) used in the embodiment of FIGS. 1 and 2, is also attachable to the glasses 10A, in a similar manner. The prescription lens unit 48 in accordance with these embodiments includes a pair of prescription lenses 50 encircled by respective rim elements 52 which are interconnected by a bridge 54 extending therebetween, as more clearly shown in FIG. 5.

Referring to FIGS. 1-6, the prescription lens unit 48 defines a curvature illustrated by line 56 preferably substantially corresponding to the curvature of the individual prescription lenses 50. As described above, the prescription lenses 50 are typically flat or have a relatively shallow curvature such as a base 6 lens, therefore the curvature 56 is more shallow than the curvature 28 (or 28A) or the curved frame 12 (or 12A) which is a base 8 frame in either one of the embodiments.

Preferably, the curvature 44 (or 44A) which substantially corresponds to the curvature of the non-prescription lenses 36 is more shallow than the curvature 28 (or 28A) but may be more curved than or have the same curve as the curvature 56. In this embodiment as shown in FIG. 1, curvature 56 is more curved than curvature 44. Prescription lens unit 48 is removably attached to the curved frame 12 (or 12A), preferably by the bridge 54 of the prescription lens unit 48 engaging with the bridge 22 (or 22A) and/or nose support 23 (or 23A), in order to allow each of the prescription lenses 50 to extend into the space 46 defined by the respective protruding rim elements 34 (or 34A) and disposed behind the respective non-prescription lenses 36 without any interference therewith.

The removable attachment of the prescription lens unit 48 to the frame 12 (or 12A) can be achieved by various known and new configurations or devices. As one example according to one embodiment of the present invention, the nose support 23A (or 23) is preferably used to secure the attachment of the prescription lens unit 48 to the frame 12 (or 12A).

In particular, the nose support 23A which is similar to nose support elements 60 extend divergently and downwardly to form a configuration adapted to be comfortably supported on a user's nose. The nose support 23A defines a contacting surface 62 adapted to abut a contacting surface 64 (see FIG. 3) defined in the frame 12A behind the bridge 22A and the inner side portions 19. The contacting surface 64 of the frame 12A is preferably recessed from the back side of the frame 12A such that the nose support 23A can be accurately positioned on the frame 12A. Each of the nose support elements 60 preferably includes one or two mounting holes 66 to snuggly receive mounting studs (not shown) projecting rearwardly from the respective inside portions 19 of the frame 12A for releasable engagement of the nose support 23A with the frame 12A.

The nose support 23A preferably further includes a groove 68 defined in the contacting surface 62 at the connector 84, which is contoured to snuggly receive the bridge 54 of the prescription lens unit 48 such that the nose support 23A also functions as means for securing the prescription lens unit 48 to the glasses 10A when the prescription lens unit 48 is attached to the glasses 10A and the bridge 54 thereof is positioned between the frame 12A and the nose support 23A.

the bridge 54 of the prescription lens unit 48 preferably includes a positioning device such as a key 70 protruding from a middle portion of the bridge 54 to be snuggly received in a groove (not shown) defined in the recessed contacting surface 64 of frame 12A to ensure appropriate positioning of the prescription lens unit 48 when it is attached to the glasses 10A.

The above-description is meant to be exemplary only, and one skilled in the art will recognize that changes may be made to the embodiments described without departure from the scope of the invention disclosed. For example, the lenses in the protruding cover lens units can be elected from any type of non-prescription lenses such as sunglasses lenses, polarized lenses, protective transparent lenses, etc., for different purposes. The non-prescription lenses can be attached to the respective protruding rim elements in any known or new methods for either removable attachment or permanent attachment thereto. The prescription lens unit may be configured differently from the described embodiment, such as a bridge directly attached to the respective prescription lenses without the rims encircling the prescription lenses. Furthermore, the frame of the eyewear can be configured differently from the above-described embodiments provided that the frame is configured in a wrap-type and is adapted to removably engage at least one protruding cover lens unit to create a space behind the cover lens to allow a prescription lens to be attached to the frame and to extend into the space without interference with the cover lens unit. Still other modifications which fall within the scope of the present invention will be apparent to those skilled in the art in light of a review of this disclosure, and such modifications are intended to fall within the appended claims.

I claim:

1. A method for attaching a prescription lens to eyewear having a curved frame defining a first curvature thereof, the method comprises:
    a) removably attaching a non-prescription lens having a second curvature thereof, to the curved frame in a protruding position with respect to a front side of the curved frame, by means of a protruding rim element, the protruding rim element having an outer periphery defining the first curvature for removable attachment with the curved frame and having an inner periphery protruding forwardly from the outer periphery thereof to define the second curvature for attachment of the non-prescription lens, thereby creating a space defined by the protruding rim element and located behind the non-prescription lens; and
    b) removably attaching the prescription lens to the curved frame to allow the prescription lens to extend into the space without interference with the non-prescription lens.

2. The method as defined in claim 1 wherein the second curvature is more shallow than the first curvature.

3. The method as defined in claim 2 wherein the prescription lens defines a third curvature thereof more shallow than the first curvature.

4. The method as defined in claim 1 wherein the prescription lens is releasably secured to the curved frame by means of a nose support of the curved frame.

5. A pair of glasses comprising:
    a curved frame defining a first curvature thereof;
    a pair of protruding cover lens units removably attached to the curved frame to position a pair of non-prescription lenses having a second curvature thereof in a protruding position with respect to a front side of the curved frame, each of the protruding cover lens units including a protruding rim element having an outer periphery defining the first curvature for the removable attachment thereof to the curved frame and having an inner periphery protruding forwardly from the outer periphery thereof to define the second curvature for at least partially encircling and securing one of the non-prescription lenses; and
    a prescription lens unit including a pair of interconnected prescription lenses removably attached to the curved frame, each of the prescription lenses extending into a space defined by the respective protruding rim elements and located behind the respective non-prescription lenses.

6. The pair of glasses as defined in claim 5 wherein each of the protruding rim elements is annular and completely encircles the non-prescription lens.

7. The pair of glasses as defined in claim 6 wherein the inner periphery of the protruding rim element at an outer end thereof protrudes further forwardly relative to the inner periphery at an inner end of the protruding rim element.

8. The pair of glasses as defined in claim 5 wherein each of the protruding rim elements is circumferentially discontinuous to define a C-shape.

9. The pair of glasses as defined in claim 8 wherein the protruding rim element is circumferentially discontinuous at an inner end thereof.

10. The pair of glasses as defined in claim 5 wherein the second curvature is more shallow than the first curvature.

11. The pair of glasses as defined in claim 5 wherein the prescription lenses define a third curvature more shallow than the first curvature.

12. The pair of glasses as defined in claim 5 wherein the curved frame comprises a nose support removably attached thereto to secure the attachment of the prescription lenses to the curved frame.

13. The pair of glasses as defined in claim 5 wherein the prescription lenses comprises a bridge extending therebetween, the bridge being removably attached to the curved frame.

* * * * *